Jan. 19, 1965     E. E. MUNK     3,166,617
METHOD AND APPARATUS FOR PRODUCING ARTICLES OF
MOLDED PARTICLE BOARD

Filed May 1, 1961     3 Sheets-Sheet 1

Inventor: Edmund E. Munk
By Dicke, Craig & Freudenberg
ATTORNEYS

INVENTOR.
EDMUND E. MUNK

BY Dicke & Craig

ATTORNEYS

INVENTOR.
EDMUND E. MUNK

BY Dicke & Craig

ATTORNEYS 3,166,617
METHOD AND APPARATUS FOR PRODUCING ARTICLES OF MOLDED PARTICLE BOARD
Edmund E. Munk, Oberstenfeld, Kreis Ludwigsburg, Germany, assignor to Furnier- und Sperrholzwerk J. F. Werz, Jr., K.G. Werzalit-Pressholzwerk Oberstenfeld, Oberstenfeld, Kreis Ludwigsburg, Germany
Filed May 1, 1961, Ser. No. 106,557
13 Claims. (Cl. 264—109)

The present invention relates to a method of producing molded articles of different thicknesses which are formed by compressing a mixture of loose organic or inorganic fibrous materials which are incapable of flowing when under pressure, for example, wood chips, excelsior, or fibers of different materials, with suitable binders, particularly synthetic resin binders, which become adhesive when heated and are then also capable of hardening. More particularly, the invention relates to a method of producing molded articles of the above-mentioned type which in industry are classified under the heading "molded particle board" and either have a uniform degree of compression and specific gravity at all parts thereof regardless of their difference in thickness, or different predetermined degrees of compression and specific gravity at different parts thereof of different thicknesses.

Prior to this invention many attempts have been made to produce molded articles of different thicknesses from a mixture of wood chips or other fibrous materials and suitable binders by pouring the loose mixture into the mold at a volumetric ratio of, for example, 5:1 to the final degree of compression, and by then compressing it so as to attain at all points the most uniform degree of compression as possible. These attempts have been successful to some degree, provided that the wall thickness of the molded articles increased or decreased gradually. However, even in such cases it required a very high degree of manual dexterity to pour the loose material from above into the open mold in a manner so as to conform with the final compressed shape of the desired product. If, however, the molded article should vary in thickness very abruptly and considerably, for example, so as to form sharp-cornered steps, it is impossible to pour the loose material from above in such a manner upon the lower member of a pressure die in which both the upper and lower members consist of solid one-piece elements that the parts of the molded particles which have different thicknesses will all have a uniform compressive strength. Those points where a thinner part of the article merges into a part of a greater thickness and where necessarily a greater amount of loose material is deposited, will then be excessively compressed and have too high a specific gravity, whereas especially the edge portions of the adjacent thicker part will not be sufficiently compressed and will therefore have too low a specific gravity, with the result that these portions of the molded product will usually have an insufficient degree of solidity. These disadvantages occur regardless of whether the mixture is compressed in a cold press to form preliminary products or whether it is compressed in a heated press to form the final articles.

It is an object of the present invention to provide a new method of compressing a loose mixture of organic or inorganic fibrous materials, for example, wood chips, excelsior, and similar materials, with suitable binders which are capable of hardening, preferably by means of heat, so as to attain molded articles in which each molded item has parts of different thicknesses, and either all of these parts have a uniform compressive strength at all points thereof, or each part has a uniform compressive strength which may differ from the compressive strength of the other parts.

The method according to the invention consists more specifically in applying the mentioned mixture in a loose condition, that is, for example, at a volumetric ratio of 5 to 1 as compared with the volume of the finally compressed article, upon the surface of the bottom die within the mold housing in accordance with the shape and thickness of the different parts of the article. This bottom die consists of several adjacent parts of a number in accordance with the number of steps to be formed and movable independently of each other in the vertical direction and to different heights. These bottom die parts cooperate with an upper die which may consist of one or more upper die parts. If the upper die consists of several parts, these parts are also movable independently of each other and at different stroke lengths in accordance with the different desired wall thicknesses of the final article. In order to maintain the desired volumetric ratio of, for example, 5:1, the bottom dies are first retracted, according to this ratio from a neutral plane which forms the longitudinal central plane of the part to be produced and also the stationary bottom die of the most deeply impressed surface of the finished article. If the upper surface of the molded article is to be substantially flat, the loose mixture of wood chips and synthetic resin is then simply filled into the mold housing while the upper die is withdrawn to a certain level within the housing which likewise corresponds to the desired ratio of compression of 5 to 1 above the neutral plane. The material is then compressed either simultaneously from opposite sides, that is, by both the upper and lower dies, or the compression is first carried out by one set of dies, for example, the lower dies, to the level of the final compression of the molded part, whereupon the other die is moved to carry out the compression from the opposite side. The number of individual movable parts of each set of dies depends upon the number of different wall thicknesses and intermediate steps to be produced in the molded article. By maintaining the same rate of compression for each different wall thickness and by moving the different die parts accordingly, the invention attains the desired object that all of the parts of the molded article will have a uniform compressive strength, and thus also a uniform specific gravity. This, in turn, insures that the parts of the molded article at and adjacent to the different steps therein will also be of the same solidity as the other parts. If the molded article has to have a substantially flat upper surface, or at any rate an upper surface which varies only gradually in thickness, the invention has the further advantage that the loose mixture may be simply poured into the mold from the open upper end to a substantially even level, and that the compression may then be carried out in one continuous operation.

If the molded article should, however, also have upper surfaces at different levels, the upper die will also be divided into several independently movable parts in accordance with the number of different surfaces to be produced. These upper die parts are at first retracted upwardly to the respective levels corresponding to the mentioned compression ratio of, for example, 5 to 1, and the mold cavity is thereupon filled from the side, for example, through a channel provided in at least one side wall of the mold or by turning the mold upon one side and by filling it from above through the other side from which the side wall has been opened or removed. During this filling operation, especially when carried out from the side, the mold is subjected to vibrations whereby the loose mixture of wood chips and synthetic resin is moved so as to fill all cavities within the mold. Thereupon, the compression operation is started either by moving some or all of the different dies simultaneously, but at different stroke lengths to the levels of the final surfaces of the molded article or by moving the dies successively relative to each other at such stroke lengths.

According to another embodiment of the invention it is possible to omit the separate driving means for moving either the upper or lower dies, and preferably the latter. In this case, the lower dies are provided with suitable resilient means, for example, in the form of springs of hydraulic cylinders, which first move these dies upwardly to a certain level from the stationary lower die surface in accordance with the desired rate of compression of, for example, 5 to 1. If the upper surface of the molded article is to be substantially flat, the upper die may then be retracted and the mold cavity be filled from above to a substantially even level in accordance with the desired compression rate, but if the upper surface of the article should also have parts with different levels, the upper dies will be retracted within the mold to their respective filling levels and the loose mixture will then be filled into the mold cavity from the side by means of vibrations in the same manner as described above. After the filling opening has been closed, only the upper die or die parts need to be depressed by the machine, whereas the lower dies yield under the pressure of the upper die or dies, which is transmitted through the partly compressed material, until the upper die or dies have completed their downward stroke. The resilient means acting upon the lower dies are made of a strength in accordance with the desired compression ratio and they are movable downwardly to certain stops in accordance with the different levels of the surfaces on the lower side of the molded article.

The principles of the method according to the invention as outlined above, as well as the numerous features and advantages thereof will become more clearly evident from the following description which illustrates some of the many possible ways of its execution and is to be read with reference to the accompanying drawings, in which—

FIGURE 1 shows diagrammatically a cross section of a mold according to the invention for carrying out the new method; while

Figure 1:
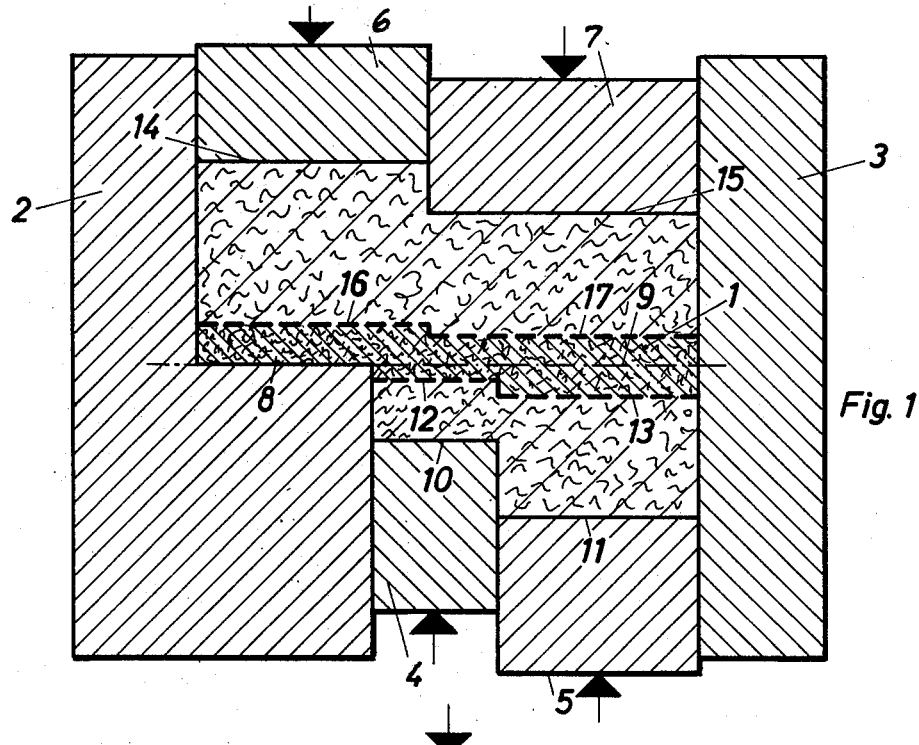

Referring first to FIGURE 1 of the drawings, the molded article 1 to be produced is assumed to have a cross-sectional shape as indicated by the dotted lines. For attaining this shape the mold consists of a stationary housing having side walls 2 and 3, two lower or bottom dies 4 and 5, and two upper dies 6 and 7. All of these dies are movable independently of each other in the vertical direction within the mold housing including side walls 2 and 3 which also guide the dies. The two parts 4, 5, and 6, 7 of each die may be moved either simultaneously with each other although at different stroke lengths, or successively, and both the upper and lower dies or their separate parts may also be moved toward each other either simultaneously or successively. Side wall 2 of the mold housing is preferably stationary and provided with a recess, the upper surface of which forms a stationary die 8. The opposite side wall is preferably removably secured to the mold housing for filling the mold cavity and for removing the molded article.

At the beginning of the operation, the lower dies 4 and 5 are retracted from a neutral plane 9 which corresponds to the plane of the stationary die 8 to filling planes 10 and 11, that is, for a distance which corresponds to the compression ratio to be attained, for example, a ratio of 5 to 1 from plane 9 in which ratio "1" constitutes the final degree of compression attained by the subsequent upward movement of the lower dies 4 and 5 which corresponds to the final lower surfaces 12 and 13 of the molded article 1, while the third surface is formed by the stationary die 8. If the article to be produced has a substantially flat horizontal upper surface, in which case only one upper die is required, the mold may be filled from above simply by pouring the loose material to be compressed upon the lower dies 8, 4 and 5 and to an even level which corresponds to a compression ratio of 5 to 1 at both sides of the neutral plane 9. If the article to be produced has, however, portions of different thicknesses from the neutral plane 9 so as to form steps as shown in FIGURE 1, the upper dies 6 and 7 are lifted to the filling planes 14 and 15 in accordance with the desired compression ratio of, for example, 5 to 1, and thereupon the loose material may be filled into the mold either from the side through a suitable channel, not shown, provided in at least one side wall of the mold housing, or from above, in which case the entire mold may be turned on one side and then filled after the opposite side wall has been removed. In order to convey the loose material uniformly and without compression into all cavities within the mold, the latter is vibrated, whereby the material "walks" in the mold even when it is inserted from the side.

Figure 3:
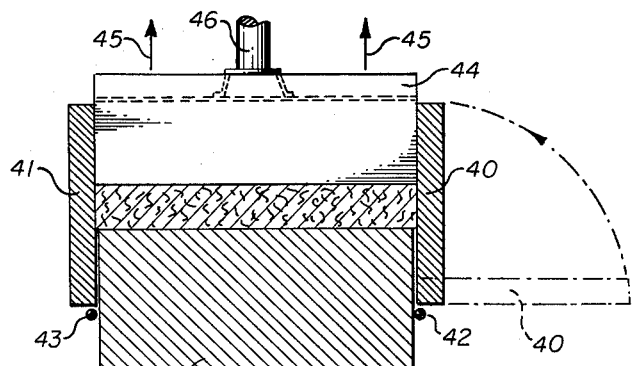
FIGURE 3 is a cross section of a mold illustrating the manner in which the mold is filled.

FIGURE 3 illustrates the filling operation of the mold. The end walls 40 and 41 are pivotally mounted at 42 and 43 on side walls 2 and 3. The mold is filled by pivoting end wall 40 about the pivot connection 42 to a horizontal plane as shown in phantom lines in FIGURE 3. A hopper 44 filled with the loose material is placed in the mold cavity and the end wall is pivoted back into its vertical position. The hopper 44 is then raised as indicated by arrows 45 and simultaneously vibrated by a vibrator 46 that is attached to the hopper 44. Thus, the mold is uniformly filled with the loose material without compression into all cavities of the mold.

After the mold has been properly filled, the individual dies are moved either simultaneously or successively from planes 10, 11 and 14, 15, toward planes 12, 13 and 16, 17, respectively, so that the volume of the material will be compressed at the desired ratio of, for example, 5 to 1, and all parts of the molded article 1 will then have a uniform compressive strength, a uniform specific gravity, and a uniform solidity.

Figure 2:
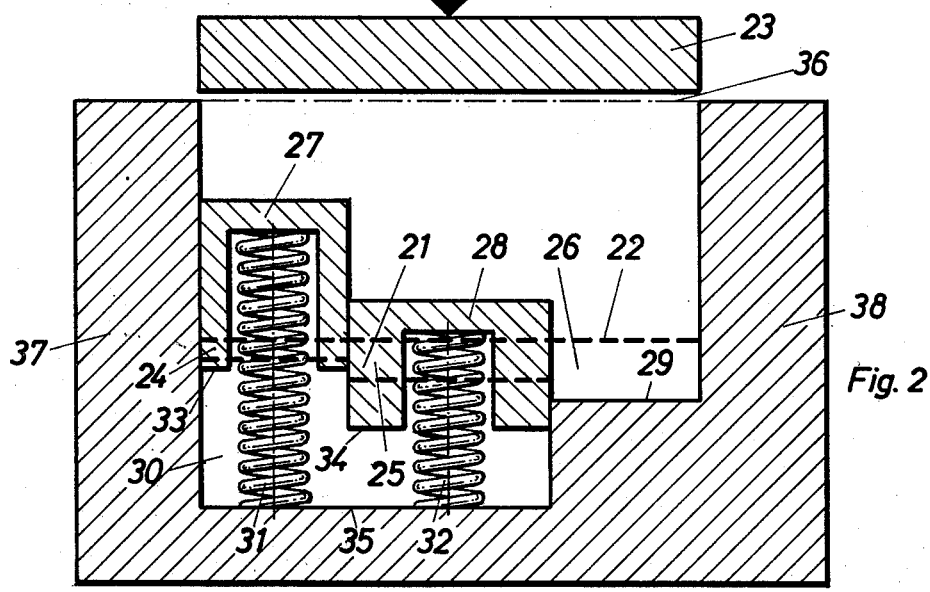
FIGURE 2 shows a cross section of a mold according to a modification of the invention.

FIGURE 2 shows a modification of the mold for producing an article 21 with a flat, upper surface 22 and a cross-sectional shape as indicated by the dotted lines. This flat upper surface 22 is produced by a single die 23, while the three parts 23, 25, and 26 of different thicknesses but of the same compressive strength are produced by two movable dies 27 and 28 for forming the two thinner parts 24 and 25 and by providing the right side of the mold housing with a recess, the lower side of which forms a stationary die surface 29 for producing the thickest part 26 of the molded article 21. Dies 27 and 28 are slidable along the side walls of a recess 30 against the action of springs 31 and 32, respectively, which are made of a suitable length and compressive strength so that, when they are fully expanded, the upper surfaces of dies 27 and 28 will be disposed at different levels corresponding to the compression ratio of, for example, 5 to 1, relative to the lower surfaces of parts 24 and 25 of the finally compressed article 21. Dies 27 and 28 have a thickness so that before being depressed, their lower surfaces 33 and 34 are spaced from the base 35 of recess 30 at distances which are likewise in accordance with the compression ratio of, for example, 5 to 1, relative to the volume of parts 24 and 25 of article 21.

In the operation of the mold according to FIGURE 2, after the upper die 23 has been lifted or removed, the loose material is first filled either from the side or from above into the mold cavity to the level 36. For the sake of illustration, this level 36 is shown as being even with the upper edges of the side walls 37 and 38 of the mold, although in actual practice, the side walls of the mold are preferably extended upwardly to guide the upper die 23 in its movement above level 36. The loose material will then be initially compressed by the continuous downward movement of the upper die 23 until at a certain degree of compression, dies 27 and 28 will yield against the action of springs 31 and 32 until the upper die 23 arrives at the end of its downward stroke at the level 22, when dies 27 and 28 are depressed to the levels of the lower surfaces of parts 24 and 25 of the finished article 21. The molded article is then finally and uniformly compressed at all points. At the following upward movement of the upper die 23, springs 31 and 32 will again expand, and the lower dies 27 and 28 will thereby lift the finished article 21 off the stationary die surface 29 so that it may then be easily removed from the mold cavity after die 23 has been sufficiently lifted.

As previously indicated, the upper die 23 according to FIGURE 2 may also be made of several individually movable parts similarly as shown in FIGURE 1, in order to produce molded articles with upper surfaces at different levels.

Figure 5:
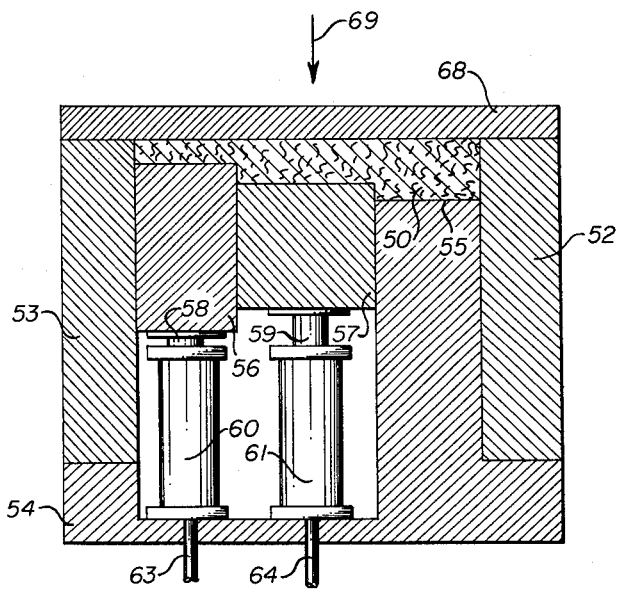
FIGURE 5 is a cross section of the mold of FIGURE 4 illustrating the mold in another operative condition.
Figure 4:
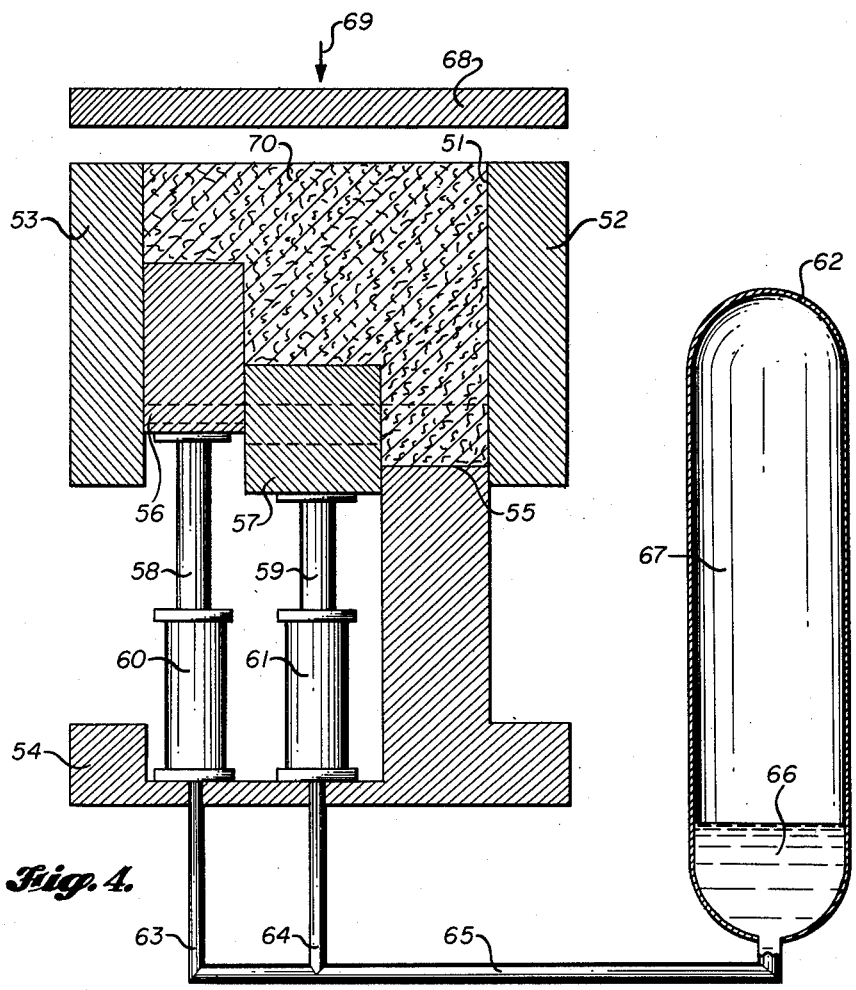
FIGURE 4 is a cross section of another mold according to the invention for carrying out the new method.

FIGURES 4 and 5 illustrate another embodiment for producing a molded article 50. In this embodiment, a mold cavity 51 is formed by side walls 52 and 53 that are slidable with respect to a base member 54 which is provided with a stationary die member 55. A pair of movable dies 56 and 57 extend into cavity 51 and are mounted on piston rods 58 and 59. The lower end of each of the rods 58 and 59 is connected to a piston, not shown, mounted in cylinders 60 and 61. The cylinders 60 and 61 are connected to the base member 54. The interior of each cylinder 60 and 61 is in fluid communication with a closed container 62 by conduits 63, 64 and 65. The container 62 is partially filled with a fluid 66 with the upper portion 67 containing air under pressure.

In operation, the parts of the mechanism are retracted, as shown in FIGURE 4. Thereafter, the cavity 51 is charged with loose material 70 in the usual manner. Then, an upper die 68 exerts a downward pressure as indicated by arrow 69 on the side walls 52 and 53 and material 70. The downward pressure will cause dies 56 and 57 to move downward. However, the dies 56 and 57 will resist any downward movement due to the upward pressure exerted on piston rods 58 and 59 by the container 62. As the die 68 moves down, the fluid 66 with cylinders 60 and 61 will be displaced and be forced into container 62 through conduits 63, 64 and 65. At the end of the stroke of die 68, an article 50 is produced having a uniform compressive strength at all parts thereof.

It is apparent that the upper die 68 may also be made in several individually movable parts similarly as shown in FIGURE 1, in order to produce articles with upper surfaces at different levels.

The material to be compressed in the molds according to the invention may consist of wood chips, excelsior, or other fibrous materials which are cut or shredded to a suitable size which may depend upon the type of article to be produced, but should at any rate be larger than a granular size at which the material is capable of flowing when under pressure. This fibrous material is mixed with a suitable binder, preferably a synthetic resin which becomes adhesive when heated and is also capable of hardening very solidly when subjected to a higher temperature. This binder is preferably mixed with the fibrous material in the form of a watery suspension. The mixing ratio of the fibrous material and the synthetic resin depends upon various factors, such as the type and particle size of the fibrous material, the type of the synthetic resin, and the type and purpose of the molded articles. When applying, for example, fine wood chips and excelsior and a synthetic resin in the form of a watery suspension, the latter is preferably intimately mixed at a ratio of its solid components of 5 to 25% of the weight of the chips. The most suitable composition may be attained by a mixture in which the solid parts of the resin amount to 12 to 15%.

The fibrous materials therefore form the main body of the molded product, rather than mere fillers, while the synthetic resin merely forms the bonding agent for these fibrous materials. Of course, suitable catalysts may be added to the mixture in order to accelerate the hardening process.

The molded articles may either form intermediate products or blanks which are subsequently subjected to a finishing treatment under heat and pressure, for example, for covering them with a veneer or a coating of hard paper, plastic, or a similar material, or for subjecting certain parts of their surfaces to a special hardening treatment in accordance with the method as described and claimed in my copending application filed on even date herewith. In the event that the molded articles merely form such intermediate products, they are compressed in a cold mold or in one which is only slightly heated so that the synthetic resin will not be hardened. If, however, the molded articles are to form finished products, they are compressed in a heated mold so that the synthetic resin will be completely set and hardened and will thereby bond the compressed wood chips or other fibrous materials into a very solid body of a great resistance against various external influences. Thus, for example, by choosing a suitable type of synthetic resin and a suitable mixing ratio thereof with the fibrous materials, the molded articles may be made highly resistant against moisture or chemical influences. As previously indicated, it is also easily possible according to the invention to produce molded articles in which simply by a stronger compression of one or more dies as compared with the compression of the other dies, one or more parts of the article are more highly compressed and thus made of a greater solidity than the other parts.

The solidity and hardness of a molded article depends primarily upon its compression and its specific gravity, which, in turn, is dependent upon the specific pressure to which the article has been subjected. This pressure may vary from about 70 to 1400 lbs./sq. in., and a preferred pressure to be applied amounts to about 350 to 500 lbs./sq. in.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of producing pressure-molded articles from a loose mixture of fibrous material and a binder, each of said articles having a plurality of adjacent portions of different thicknesses with surfaces extending substantially in the same direction and disposed at different levels at least at one of two opposite sides thereof, and each being separated from the surface of the adjacent portion by at least one angular edge in a mold housing having fixed opposite walls and a pair of dies movable in opposite directions in said housing, at least one of said dies being divided into separably movable parts corresponding essentially in area to said portions of different thicknesses comprising retracting each part of said one die from a neutral plane defined by the plane of the most deeply impressed surface of said article a distance below said neutral plane essentially corresponding to the distance of the finished portion produced thereby times a predetermined volumetric ratio of compression of said loose mixture as compared with the volume of the finished article, filling said mold housing with a loose mixture of fibrous materials and a binder in said predetermined volumetric ratio of compression, said mixture being incapable of flowing when under pressure, and thereafter compressing said mixture to the degree of compression determined by said volumetric ratio of compression, whereby after being compressed each of said adjacent portions of different thicknesses has a uniform degree of compression at all parts thereof.

2. A method of producing pressure-molded articles from a loose mixture of fibrous materials and a binder, each of said articles having a plurality of adjacent portions of different thicknesses with surfaces extending substantially in the same direction and disposed at different levels at least at one of two opposite sides thereof, each of said portions being separated from the surface of the adjacent portion by at least one angular edge in a mold housing having fixed opposite walls and a pair of dies movable in opposite directions in said housing, at least one of said dies being divided into separably movable parts essentially corresponding in area to said portions of different thicknesses, comprising retracting each said part of said one die from a neutral plane defined by the plane of the most deeply impressed surface of said article a distance therebelow corresponding to the predetermined volumetric ratio of compression defined by the volume of said mixture below said neutral plane as compared to the volume of the finished article below said neutral plane, filling said mold housing below said neutral plane with said loose mixture, filling said mold housing above said neutral plane with said loose mixture in an amount determined by the predetermined volumetric ratio of compression defined by the volume of said mixture as compared to the volume of the finished article above said neutral plane, said loose mixture being incapable of flowing when under pressure, and thereafter compressing said loose mixture in said mold housing by said dies to form said article, whereby after being compressed at least two of said adjacent portions of different thicknesses have a uniform degree of compression at all parts thereof.

3. A method of producing pressure-molded articles from a loose mixture of fibrous material and a binder, each of said articles having a plurality of adjacent portions of different thicknesses with surfaces extending substantially in the same direction and disposed at different levels at least at one of two opposite sides thereof, and each being separated from the surface of the adjacent portion by at least one angular edge, comprising the steps of forming a mold cavity defined by fixed opposite side walls spaced from each other at distances substantially equal to the length and width of the article to be produced, and by upper and lower walls at least one of which is divided into several separate movable parts, each of said parts having a pressure surface of a size substantially in accordance with the size of the surface of one of said portions of the article, spacing each of said movable parts from the surface of the opposite wall a predetermined distance in accordance with the volume of said loose mixture to be compressed to produce the corresponding portion, filling said entire mold cavity completely with said loose mixture of fibrous materials and a binder, said mixture being incapable of flowing when under pressure, and then moving the parts of said upper and lower walls toward the opposite wall parts for the distance required to compress said mixture to the desired thicknesses and levels of the individual portions of said article, whereby a uniform degree of compression of each portion is obtained.

4. A method of producing pressure-molded articles from a loose mixture of a fibrous material and a binder, each of said articles having a plurality of adjacent portions of different thicknesses with surfaces extending substantially in the same direction and disposed at different levels at each of two opposite sides thereof, each of said surfaces at each side being separated from the surface of the adjacent portion by at least one angular edge, comprising the steps of forming a mold cavity defined by fixed opposite side walls spaced from each other at distances substantially equal to the length and width of the article to be produced, and by opposite upper and lower walls, each of which is divided into several separably movable parts, each of said parts having a pressure surface of a size in accordance with the size of the surface of one of said portions of the article, retracting each of said movable parts from the surface of the opposite wall portion a certain distance in accordance with the volume to be compressed to produce the corresponding portion of said article, filling said entire mold cavity completely with a said loose mixture of fibrous materials and a binder, said mixture being incapable of flowing when under pressure, and then moving each of said separate wall parts toward the opposite wall for the distance required to compress said mixture to the desired thicknesses and levels of the individual portions of said article and to a uniform degree of compression of each portion.

5. A method of producing pressure-molded articles from a loose mixture of fibrous material and a binder, each of said articles having a plurality of adjacent portions of different thicknesses with surfaces extending substantially in the same direction and disposed at different levels at least at one of two opposite sides thereof, and each being separated from the surface of the adjacent portion by at least one angular edge, comprising the steps of forming a mold cavity defined by fixed opposite side walls spaced from each other at distances substantially equal to the length and width of the article to be produced, and by upper and lower walls, at least one of which is divided into several separably movable parts, each of said parts having a pressure surface of a size substantially in accordance with the size of the surface of one of said portions of the article, spacing each of said parts from the surface of the opposite wall a certain distance in accordance with the volume to be compressed to produce the corresponding portion of said article, filling said entire mold cavity completely with a loose mixture of fibrous material and a binder, said mixture being incapable of flowing when under pressure, said parts of one of said upper and lower walls being individually resiliently yieldable when subjected to a pressure of the parts of the opposite wall, and then moving the parts of said opposite wall for the distance required to compress said mixture to the desired thickness and levels of the individual portions of said article and to a uniform degree of compression of each portion, whereby said yieldable wall parts are at the same time depressed through said mixture to different levels in accordance with the desired levels of the surface portions of the article engaging with said yieldable wall parts.

6. A method of producing pressure-molded articles from a loose mixture of fibrous material and a binder being incapable of flowing when under pressure, said articles having a plurality of adjacent portions of different thicknesses with surfaces extending substantially in the same direction and disposed at different levels and being separated from the surface of the adjacent portion by at least one angular edge and each individual portion having a uniform degree of compression, comprising the steps of: forming a mold cavity having fixed opposite side walls and movable upper and lower walls, providing said movable upper and lower walls with several separate movable parts each movable independently of the other, spacing each of said movable parts a predetermined distance apart in accordance with the volume of loose mixture to be compressed to produce the corresponding portion, filling the mold cavity with the loose mixture of fibrous materials and binder, and then moving the movable parts of said upper and lower movable walls toward each other for the distance required to compress the mixture to the desired thickness and levels of the individual portions of the article.

7. A method of producing pressure-molded articles in accordance with claim 6, together with the additional step of vibrating the cavity after said cavity is filled.

8. A method of producing pressure-molded articles from a loose mixture of fibrous material and a binder incapable of flowing when under pressure, each of said articles having a plurality of adjacent portions of different thicknesses with surfaces extending substantially in the same direction and disposed at different levels and each being separated from the surface of the adjacent portion by at least one angular edge and each individual portion having a uniform degree of compression, comprising the steps of: forming a mold cavity having fixed opposite side walls, an upper movable wall and a lower wall, providing said lower wall with a spring-biased movable member at one position in said cavity, providing said lower wall with another spring-biased movable member at a different postion in said cavity, moving the upper movable member a predetermined distance from said lower wall in accordance with the volume of loose mixture to be compressed to produce the corresponding portions, filling said cavity with said loose mixture of fibrous material and binder, and then moving the upper movable wall toward the lower wall for the distance required to compress the mixture to the desired thickness and levels of individual portions of said article.

9. A method of producing pressure-molded articles in accordance with claim 8 together with the additional step of vibrating said cavity after said cavity has been filled.

10. An apparatus for producing pressure-molded articles, each having a plurality of adjacent portions of different thicknesses with surfaces extending in substantially the same direction and disposed at different levels at least at one of two opposite sides thereof, and each being separated from the surface of the adjacent portion by at least one angular edge, comprising a mold having a housing including fixed opposite lateral walls spaced from each other at distances substantially equal to the length and width of the article to be produced, and upper and lower dies both movable in opposite directions within said housing and each being divided into separably movable parts, each of said parts having a pressure surface of a size substantially in accordance with the size of the surface of one of said portions of the article, means for moving said dies apart to form an intermediate mold cavity of a shape in proportion to the shape of the article to be produced but of a greater size in accordance with the volume of material to be compressed to produce each particular portion of said article, means in at least one of said lateral walls for filling a loose mixture of fibrous materials and a binder into said mold cavity, said mixture being incapable of flowing when under pressure, vibrating means for filling said mold cavity completely, and means for moving each of said die parts toward the opposite die parts for a distance different from the adjacent part of each die so that each of said portions of the article will be compressed to the desired thickness and level and to a uniform degree of compression.

11. An apparatus for producing pressure-molded articles, each having a plurality of adjacent portions of different thicknesses with surfaces extending in substantially the same direction and disposed at different levels at least at one of two opposite sides thereof, and each being separated from the surface of the adjacent portion by at least one angular edge, comprising a mold having a housing including fixed opposite lateral walls spaced from each other at distances substantially equal to the length and width of the article to be produced, and upper and lower dies movable relative to each other within said housing, at least one of said dies being divided into several separately movable parts, resilient means acting upon said parts of one of said dies in the direction toward the other die to maintain said parts at certain different levels when the other die is retracted from said first die so as to form an intermediate mold cavity within said housing of a shape in proportion to the shape of the article to be produced but of a greater size in accordance with the volume of material to be compressed to produce each particular portion of said article, said mold cavity adapted to be filled completely with a loose mixture of fibrous materials and a binder, said mixture being incapable of flowing when under pressure, and means for moving the parts of said other die toward said first die for the distance required to compress said mixture to the desired thickness and levels of the individual portions of said article and to a uniform degree of compression of each portion, whereby said first die parts will be depressed through said mixture against the action of said resilient means, and stop means for limiting the extent of depression of said first die parts so that the pressure surfaces thereof will be depressed only to the different desired levels of the surface portions of the article engaging with said pressure surfaces.

12. An apparatus for producing pressure-molded articles having a plurality of adjacent portions of different thicknesses with surfaces extending in substantially the same direction and disposed at different levels and being separated from the surface of the adjacent portion by at least on angular edge, comprising: a mold having a housing including fixed opposite lateral walls spaced a predetermined distance apart, an upper movable die within said housing, a lower wall provided with a stationary die surface above said lower wall to form a recess; a pair of resiliently mounted movable members mounted in said recess each having a surface of a size substantially in accordance with the size of the surface of one of said portions of said article, means for moving said upper die away from said lower die to form an intermediate mold cavity for moving said upper die toward said lower die whereby the portions of the article will be compressed to the desired thickness and level to a uniform degree of compression.

13. An apparatus for producing pressure-molded articles in accordance with claim 12 together with vibrating means for vibrating said housing and means for filling said mold cavity.

References Cited in the file of this patent

UNITED STATES PATENTS

| | | |
|---|---|---|
| 418,099 | White et al. | Dec. 24, 1889 |
| 1,286,681 | Loudenbeck | Dec. 3, 1918 |
| 1,301,095 | Brisbin | Apr. 22, 1919 |
| 2,057,466 | Willetts | Oct. 13, 1936 |
| 2,135,803 | Dumert | Nov. 8, 1938 |
| 2,181,619 | Co Van et al. | Nov. 28, 1939 |
| 2,719,328 | Patton et al. | Oct. 4, 1955 |
| 2,737,997 | Himmelheber | Mar. 13, 1956 |
| 2,798,019 | Verbestel | July 2, 1957 |
| 2,960,423 | Kreibaum | Nov. 15, 1960 |
| 2,979,770 | Greene et al. | Apr. 18, 1961 |

FOREIGN PATENTS

| | | |
|---|---|---|
| 1,011,675 | France | Apr. 9, 1952 |
| 1,160,142 | France | July 8, 1958 |
| 139,820 | Germany | May 28, 1903 |
| 193,824 | Germany | Jan. 6, 1908 |
| 341,634 | Germany | Oct. 6, 1921 |